US012710921B2

(12) United States Patent
Hu et al.

(10) Patent No.: US 12,710,921 B2
(45) Date of Patent: Aug. 18, 2026

(54) SOUND EFFECT DISPLAY METHOD AND TERMINAL DEVICE

(71) Applicant: Beijing Zitiao Network Technology Co., Ltd., Beijing (CN)

(72) Inventors: Shun Hu, Beijing (CN); Chaopeng Liu, Beijing (CN); Yipeng Huang, Beijing (CN); Xiaoyu Zhu, Beijing (CN); Kexin Lin, Los Angeles, CA (US); Chenyu Sun, Los Angeles, CA (US); Zihao Chen, Los Angeles, CA (US)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 18/695,306

(22) PCT Filed: Sep. 16, 2022

(86) PCT No.: PCT/CN2022/119321
§ 371 (c)(1),
(2) Date: Mar. 25, 2024

(87) PCT Pub. No.: WO2023/071596
PCT Pub. Date: May 4, 2023

(65) Prior Publication Data

US 2025/0004709 A1 Jan. 2, 2025

(30) Foreign Application Priority Data

Oct. 25, 2021 (CN) ......................... 202111243092.2

(51) Int. Cl.
*G06F 3/048* (2013.01)
*G06F 3/16* (2006.01)

(52) U.S. Cl.
CPC .............. *G06F 3/167* (2013.01); *G06F 3/048* (2013.01); *G06F 3/165* (2013.01)

(58) Field of Classification Search
CPC ................................................. G06F 3/048–05
See application file for complete search history.

(56) References Cited

U.S. PATENT DOCUMENTS

2015/0067511 A1* 3/2015 Lee ......................... G06F 3/165 715/716
2015/0205570 A1 7/2015 Johnston
(Continued)

FOREIGN PATENT DOCUMENTS

CN 106468997 A 3/2017
CN 107918514 A 4/2018
(Continued)

OTHER PUBLICATIONS

Liang et al., "Overview of Audio Processing Master Audit 2.0 Usage Methods and Skills (Part 1)", TV subtitles (special effects and animation), Audition 2.0, 2007, 4 pages.
(Continued)

*Primary Examiner* — Daniel Rodriguez
(74) *Attorney, Agent, or Firm* — Astute IP Law Group

(57) ABSTRACT

Provided are a sound effect display method and a terminal device. The method includes receiving a first operation input to a target audio file; in response to the first operation, displaying a sound effect display interface corresponding to the target audio file, the sound effect display interface includes a grid, a sound wave line, and a cover image corresponding to the target audio file; the grid is located on a first plane in an interface scenario of the sound effect display interface, and the first plane is a horizontal plane in the interface scenario; the sound wave line is a closed curve in the first plane, and is used for displaying a sound wave waveform corresponding to a preset sound attribute of the
(Continued)

target audio file; and the cover image is on a second plane in the interface scenario.

20 Claims, 4 Drawing Sheets

(56) References Cited

U.S. PATENT DOCUMENTS

| | | | | |
|---|---|---|---|---|
| 2016/0035323 | A1* | 2/2016 | Na | G06F 3/04883 345/589 |
| 2016/0266731 | A1 | 9/2016 | Zhao et al. | |
| 2019/0215397 | A1* | 7/2019 | Ekstrand | G06F 3/0481 |
| 2020/0380769 | A1 | 12/2020 | Liu et al. | |
| 2021/0019113 | A1* | 1/2021 | Moon | G06F 3/0346 |
| 2021/0385599 | A1* | 12/2021 | Jin | G10H 1/368 |
| 2022/0086367 | A1* | 3/2022 | Boyd | H04L 51/10 |
| 2024/0296870 | A1* | 9/2024 | Zheng | G06F 3/04842 |

FOREIGN PATENT DOCUMENTS

| | | | |
|---|---|---|---|
| CN | 109634700 | A | 4/2019 |
| CN | 109636885 | A | 4/2019 |
| CN | 109814956 | A | 5/2019 |
| CN | 110609649 | A | 12/2019 |
| CN | 112416346 | A | 2/2021 |
| CN | 112738634 | A | 4/2021 |
| CN | 113050857 | A | 6/2021 |
| CN | 113192152 | A | 7/2021 |
| CN | 113259740 | A | 8/2021 |
| CN | 113284523 | A | 8/2021 |
| CN | 113301414 | A | 8/2021 |
| CN | 113365134 | A | 9/2021 |
| CN | 113885830 | A | 1/2022 |
| CN | 113885830 | B | 7/2024 |
| FR | 3035294 | A1 | 10/2016 |
| WO | 2013139067 | A1 | 9/2013 |

OTHER PUBLICATIONS

Notice of Allowance for Chinese Patent Application No. 202111243092.2, mailed Jun. 3, 2024, 7 pages.

Siyu et al., "Research on Intelligent Design of Music Visualization Based on Computer Image Style Transfer", Packaging Engineering, TB472, Aug. 16, 2020, 3 pages.

Voloshchenko et al., "Effect of anomalous transparency of a liquid-gas interface for sound waves", Article, Acoustical Physics, vol. 59, 2013, 5 pages.

International Search Report and Written Opinion for PCT/CN2022/119321, mailed Dec. 8, 2022, 12 pages.

Office Action for Chinese Patent Application No. 202111243092.2, mailed Apr. 13, 2023, 14 pages.

* cited by examiner

SOUND EFFECT DISPLAY METHOD AND TERMINAL DEVICE

This is a national stage application based on International Patent Application No. PCT/CN2022/119321, filed Sep. 16, 2022, which claims priority to Chinese patent application No. 202111243092.2 filed on Oct. 25, 2021 entitled "A SOUND EFFECT DISPLAY METHOD AND TERMINAL DEVICE", the disclosures of which are incorporated herein by reference in their entireties.

TECHNICAL FIELD

The present application relates to the technical field of terminals, and in particular to a sound effect display method and a terminal device.

BACKGROUND

With the continuous development of the multimedia technology, users are no longer satisfied only with the status that a playing device can provide an audio or video files restored at high-precision, but put forward a new requirement for the overall feeling on the playing content.

At present, most of audio playing applications (Applications) have focused on the users' listening experience when an audio is played, but overlook the effect of the visual experience of the sound effect display interface on the overall feeling of the audio playing. Because the effect of the visual experience of the sound effect display interface on the overall feeling of the audio playing is not considered, many audio playing applications display a very monotonous image in the display screen of a terminal device in scenes, such as playing audio files. For example, some music playing applications always display a static picture associated with the played music on the music player interface when playing songs. However, the visual experience of the sound effect display interface has a very important influence on the overall experience of the audio playing, and thus how to improve the visual experience of the sound effect display interface is also a very important research topic.

SUMMARY

In view of the above, embodiments of the present application provide a sound effect display method and a terminal device, which are used for improving the visual experience of a sound effect display interface.

In order to achieve the objective above, the embodiments of the present application provide the following technical solutions.

In a first aspect, an embodiment of the present application provides a sound effect display method, including:

receiving a first operation that is input to a target audio file; and displaying a sound effect display interface corresponding to the target audio file in response to the first operation, wherein the sound effect display interface includes a grid, a sound wave line, and a cover image corresponding to the target audio file; the grid is located on a first plane in an interface scenario of the sound effect display interface, and the first plane is a horizontal plane in the interface scenario; the sound wave line is a closed curve in the first plane and is configured to display a sound waveform corresponding to a preset sound attribute of the target audio file; the cover image is located on a second plane in the interface scenario, and a lower edge of the cover image is located in an area enclosed by the sound wave line on the first plane, and the second plane is a plane perpendicular to a depth direction of the interface scenario.

In a second aspect, an embodiment of the present application provides a terminal device, including:

a receiving unit configured to receive a first operation that is input to a target audio file; and a displaying unit configured to display a sound effect display interface corresponding to the target audio file in response to the first operation, wherein the sound effect display interface includes a grid, a sound wave line, and a cover image corresponding to the target audio file; the grid is located on a first plane in an interface scenario of the sound effect display interface, and the first plane is a horizontal plane in the interface scenario; the sound wave line is a closed curve in the first plane, and is configured to display a sound waveform corresponding to a preset sound attribute of the target audio file; the cover image is located on a second plane in the interface scenario, and a lower edge of the cover image is located in an area enclosed by the sound wave line on the first plane, and the second plane is a plane perpendicular to a depth direction of the interface scenario.

In a third aspect, an embodiment of the present application provides an electronic apparatus including a memory and a processor, the memory is configured for storing a computer program; and the processor is configured to enable the electronic apparatus to realize the sound effect display method described in any one of the above-described embodiments upon the processor calling the computer program.

In a fourth aspect, an embodiment of the present application provides a computer-readable storage medium having a computer program stored thereon, the computer program enables a computing apparatus to realize the sound effect display method described in any one of the above-described embodiments upon the computer program being executed by the computing apparatus.

In a fifth aspect, an embodiment of the present application provides a computer program product, which enables a computer to realize the sound effect display method described in any one of the above-described embodiments upon the computer program product being executed on the computer.

According to the sound effect display method provided by the embodiments of the present application, when a first operation that is input to a target audio file is received, a sound effect display interface corresponding to the target audio file is displayed in response to the first operation. The sound effect display interface includes a grid, a sound wave line, and a cover image corresponding to the target audio file; the grid is located on a horizontal plane in an interface scenario of the sound effect display interface, the sound wave line is a closed curve in the horizontal plane, the cover image is located in a plane perpendicular to a depth direction of the interface scenario of the sound effect display interface, and a lower edge of the cover image is located in an area enclosed by the sound wave line in the horizontal plane. Therefore, a three-dimensional sound effect display interface is generated by a grid, a sound wave line, and a cover image in the embodiments of the present application, which can allow the sound effect display interface to have spatial and three-dimensional senses, thereby improving the visual experience of the sound effect display interface.

BRIEF DESCRIPTION OF THE DRAWINGS

The accompanying drawings herein are incorporated into and constitute a part of this specification, which illustrate the embodiments in conformity with the present application and serve to explain the principles of the present application together with the description.

To illustrate the technical solutions in embodiments of the present application or the related art more clearly, the accompanying drawings which are required to describe the embodiments or the related art will be briefly described below. Apparently, for one of ordinary skill in the art, other drawings can be obtained on the basis of these drawings without any creative work.

DETAILED DESCRIPTION

To understand the above objects, features, and advantages more clearly, the solutions of the present application will be further described below. It is to be noted that, without conflicting with each other, the embodiments and features in embodiments of the present application can be combined with each other.

Many particular details are set forth in the following description to sufficiently understand the present application, but the present application can be implemented by other ways than those described herein. Obviously, the embodiments in the description are merely some, not all embodiments of the present application.

In the embodiments of the present application, the terms like "exemplary" or "for example/such as", etc. are used to represent an example, exemplary illustration, or explanation. Any embodiment or design described as being "exemplary" or "for example/such as" should not be construed to be more preferable or advantageous over other embodiments or designs. Specifically, the use of the terms "exemplary" or "fox example/such as" is intended to present an associated concept in a specific manner. In addition, in the description of the embodiments of the present application, "a plurality of/multiple" refers to two or more, unless otherwise specified.

Figure 1:
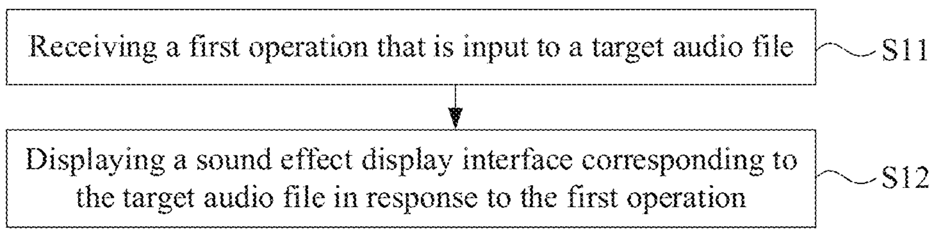
FIG. 1 is a flowchart of steps of a sound effect display method provided by an embodiment of the present application.

Based on the above contents, an embodiment of the present application provides a sound effect display method. Referring to FIG. 1, the sound effect display method includes the following steps.

S11, receiving a first operation that is input to a target audio file.

The first operation in the embodiment of the present application may be an operation for triggering to play the target audio file, or an operation for sharing the target audio file, and may also be an operation for generating and previewing a sound effect display interface of the target audio file. Particularly, the first operation can be a click operation on the target audio file, or a voice command, or a specific gesture. In some embodiments of the present application, the specific gesture may be any one of a click gesture, a swipe gesture, a pressure recognition gesture, a long-press gesture, an area-change gesture, a double press gesture, and a double click gesture.

The target audio file in the embodiment of the present application can be any type of audio file. For example, it may be a song, an audio novel, a music accompaniment and so on.

S12, displaying a sound effect display interface corresponding to the target audio file in response to the first operation.

The sound effect display interface includes a grid, a sound wave line, and a cover image corresponding to the target audio file; the grid is located on a first plane in an interface scenario of the sound effect display interface, and the first plane is a horizontal plane in the interface scenario; the sound wave line is a closed curve in the first plane and is configured to display a sound waveform corresponding to a preset sound attribute of the target audio file; the cover image is located on a second plane in the interface scenario, and a lower edge of the cover image is located in an area enclosed by the sound wave line on the first plane, and the second plane is a plane perpendicular to a depth direction of the interface scenario.

In some implementations, the preset sound attribute of the target audio file in the embodiment of the present application can be a loudness of the sound corresponding to the target audio file, a tone of the sound corresponding to the target audio file, and the like, which is not limited in the embodiment of the present application.

It is to be noted that the sound effect display interface in the embodiment of the present application is a two-dimensional image interface, while the interface scenario of the sound effect display interface is a three-dimensional scenario with a depth, so the sound effect display interface is a projection of the interface scenario of the sound effect display interface in a two-dimensional space.

It is to be noted that when the first operation is a different operation to the target audio file, the sound effect display interface is a different display interface of the target audio file. For example, when the first operation is a playing operation to the target audio file, the sound effect display interface can be a playing interface of the target audio file. For another example, when the first operation is a sharing operation to the target audio file, the sound effect display interface can be a sharing preview interface of the target audio file.

Figure 2:
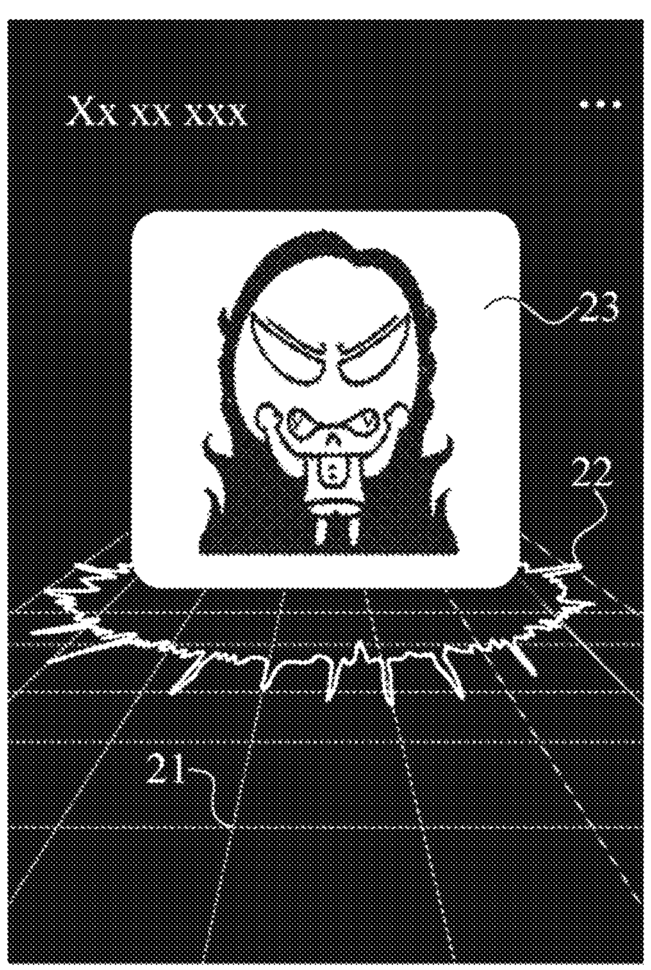
FIG. 2 a first schematic diagram of a sound effect display interface provided by an embodiment of the present application.

By way of example, referring to FIG. 2, the sound effect display interface includes a grid 21, a sound wave line 22, and a cover image 23. The grid 21 is located in a horizontal plane of an interface scenario of the sound effect display interface. The sound wave line 22 is a closed curve in the horizontal plane and is configured to show a sound waveform corresponding to a preset sound attribute of the target audio file. The cover image 23 is located on a plane perpendicular to a depth direction of the interface scenario, and a lower edge of the cover image 23 is located in an area enclosed by the sound wave line 22 on the horizontal plane.

It is also to be noted that in FIG. 2, in an initial state (the state where the sound waveform corresponding to the preset sound attribute of the target audio file is not shown), the sound wave line is shown as a circle in the first plane by way of example, but the embodiment of the present application is not limited to this. In the initial state, the sound wave line in the embodiment of the present application can also be a closed curve in other shapes, such as a quadrangle, a hexagon, an ellipse, an irregular shape, and the like.

According to the sound effect display method provided by the embodiment of the present application, when a first operation that is input to a target audio file is received, a sound effect display interface corresponding to the target audio file is displayed in response to the first operation. The sound effect display interface includes a grid, a sound wave line, and a cover image corresponding to the target audio file, the grid is located on a horizontal plane in an interface scenario of the sound effect display interface, the sound wave line is a closed curve in the horizontal plane, the cover image is located in a plane perpendicular to a depth direction of the interface scenario of the sound effect display interface, and a lower edge of the cover image is located in an area enclosed by the sound wave line in the horizontal plane. Therefore, a three-dimensional sound effect display interface is generated by a grid, a sound wave line, and a cover image in the embodiments of the present application, which can allow the sound effect display interface to have spatial and three-dimensional senses, thereby improving the visual experience of the sound effect display interface.

Figure 3:
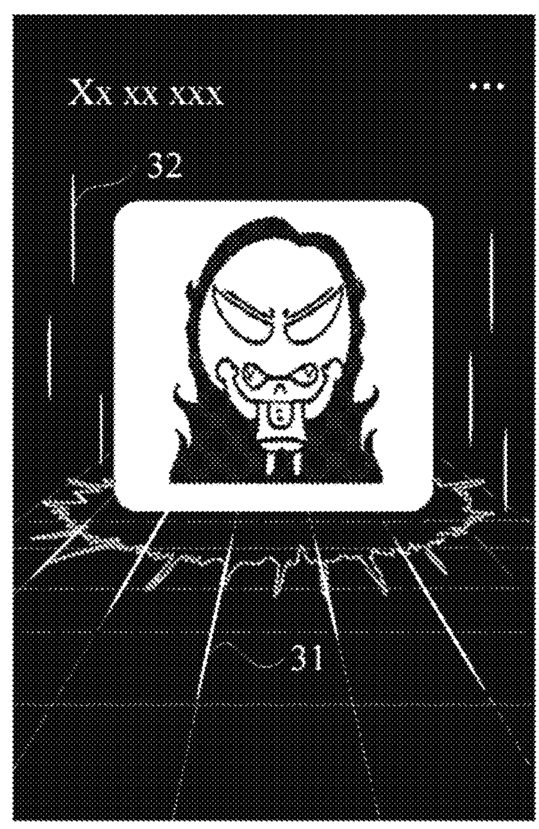
FIG. 3 is a second schematic diagram of a sound effect display interface provided by an embodiment of the present application.

In some implementations, referring to FIG. 3, the sound effect display interface further includes a plurality of first light beams 31 and a plurality of second light beams 32.

The plurality of first light beams 31 are all located on the first plane, and the plurality of first light beams 31 are parallel to each other.

The plurality of second beams 32 are all perpendicular to the first plane.

Because the sound effect display interface provided by the embodiment of the present application further includes a plurality of first light beams which are located on the first plane and parallel to each other and a plurality of second light beams which are perpendicular to the first plane, a more realistic stereoscopic effect can be generated by the plurality of first light beams and the plurality of second light beams in the above embodiments of the present application, thereby further improving the visual experience of the sound effect display interface.

Figure 4:
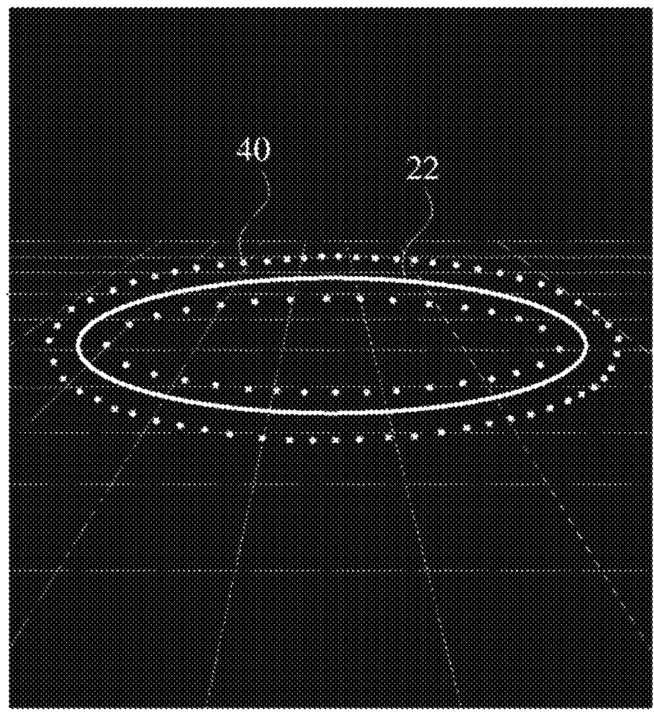
FIG. 4 is a schematic diagram of a light dot matrix provided by an embodiment of the present application.

In some implementations, referring to FIG. 4, the sound effect display interface further includes a light dot matrix 40.

The light dot matrix is located on the first plane, and the light spots of the light dot matrix 40 are arranged around both sides of the sound wave line 22.

That is, the light dot matrix 40 composed of a plurality of light spots is provided along both of an inner side and an outer side of the sound wave line 22.

Because the sound effect display interface provided by the embodiment of the present application further includes a light dot matrix composed of a plurality of light spots, the above-described embodiment enables the sound effect display interface to display more details, thereby further improving the visual experience of the sound effect display interface.

In some implementations, a distance from the sound wave line to an edge of the sound effect display interface is greater than or equal to a threshold distance.

Exemplarily, the threshold distance may be a distance of 20 pixel points (20 px).

Figure 5:
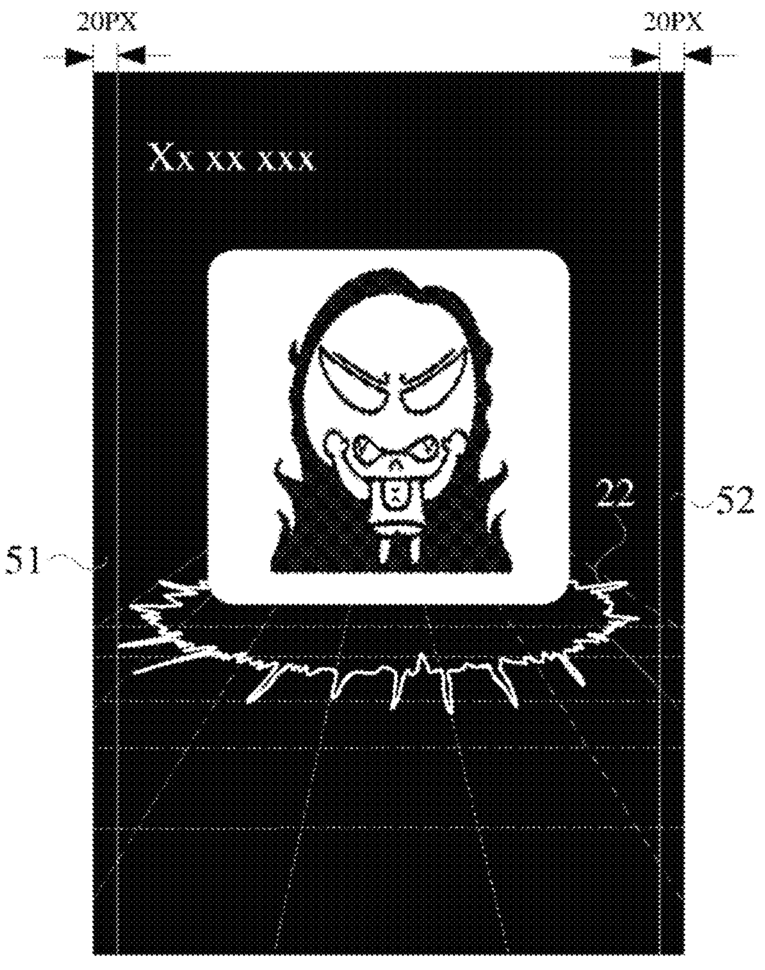
FIG. 5 is a third schematic diagram of a sound effect display interface provided by an embodiment of the present application.

Exemplarily, as shown in FIG. 5, the threshold distance is illustrated as 20 px in FIG. 5 by way of example. During a process of the sound wave line 22 displaying a sound waveform corresponding to the preset sound attribute of the target audio file, the sound waveform will not appear in a first area 51 and a second area 52 at the edge of the sound effect display interface.

Because the distance from the sound wave line to the edge of the sound effect display interface in the above-described embodiment is set to be greater than or equal to the threshold distance, the above-described embodiment can avoid the problem that the sound effect display interface cannot completely display the sound wave line, thereby avoiding affecting the visual experience of the sound effect display interface.

In some implementations, the above-described step S12 (displaying the sound effect display interface corresponding to the target audio file) includes the following steps a to b.

Step a, generating a sequence frames corresponding to the grid, the plurality of first light beams and the plurality of second light beams.

Positions of the plurality of first light beams and the plurality of second light beams in an image frame of the sequence frames vary sequentially.

The sequence frames in the embodiment of the present application refer to a file with similar video effect, which is obtained by sorting a plurality of image frames and displaying the plurality of sorted images at a preset refresh rate.

Step b, circularly playing the sequence frames to display the sound effect display interface corresponding to the target audio file.

According to the above-described embodiment, the grid, the first light beams and the second light beams in the sound effect display interface are displayed by a sequence frames; in this way, as compared with the sound effect display interface obtained by rendering the grid, the first light beams, and the second light beams in real time, the embodiment of the present application can achieve a dynamic effect without using an animation engine with particle effect, thereby reducing the data processing amount for rendering the sound effect display interface and preventing a terminal device with poor performance from failing to normally display the sound effect display interface of the embodiment of the present application.

In some implementations, the above-described step S12 (displaying the sound effect display interface corresponding to the target audio file) includes displaying the sequence frame, the sound wave line, and the cover image in different layers of the sound effect display interface, respectively.

Figure 6:
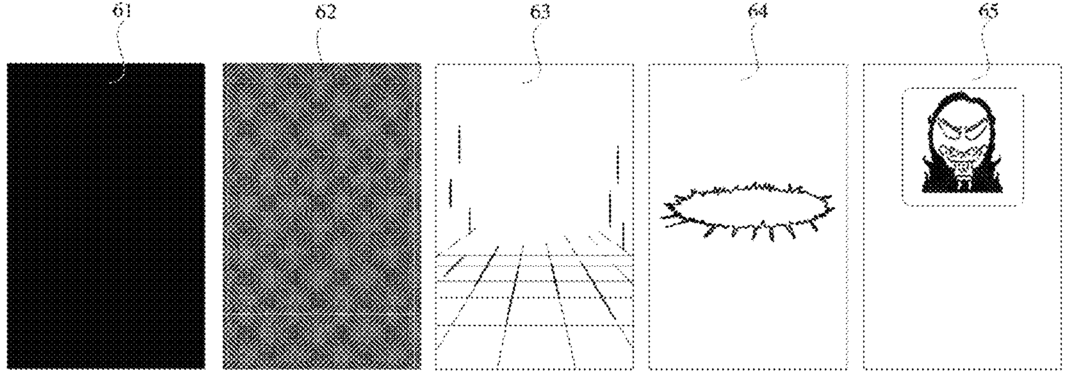
FIG. 6 is a schematic diagram of a layer structure of a sound effect display interface provided by an embodiment of the present application.

Exemplarily, referring to FIG. 6, the sound effect display interface in the embodiment of the present application includes five layers, which are, from the bottom to the top, a foundation layer 61, a background layer 62, a basic frame layer 63, a sound wave line layer 64, and a cover image layer 65, respectively.

The foundation layer 61 is configured to display a foundation image having a shape and a size as same as those of the sound effect display interface, and all the pixel points have a preset color with a shading rate of 100%. Exemplarily, the color of each of the pixel points of the foundation image is a black color or a dark black or dark blue color.

The background layer 62 is configured to display a background image having a shape and a size as same as those of the sound effect display interface, and all the pixel points have the same color, which is determined according to the cover image and has a shading rate of 30%.

The basic frame layer 63 is configured to display a sequence frames generated from a plurality of images including the grid, the plurality of first light beams, and the plurality of second light beams, with a shading rate of 100%.

The sound wave line layer 64 is configured to display the sound wave line, with a shading rate of 100%.

The cover image layer 65 is configured to display the cover image, with a shading rate of 100%.

In some implementations, a color of a first position of the sound wave line is a first color, and a color of a second position of the sound wave line is a second color.

Between the first position and the second position of the sound wave line, a color of the sound wave line is gradually varied from the first color to the second color.

In some implementations, the first position and the second position are two intersection positions of a target straight line and the sound wave line, respectively. The target straight line is a straight line passing through a geometric center of the sound wave line in the first plane and having an included angle with respect to a horizontal direction, and the included angle is a preset angle. Exemplarily, the preset angle may be 30 degrees.

Figure 7:
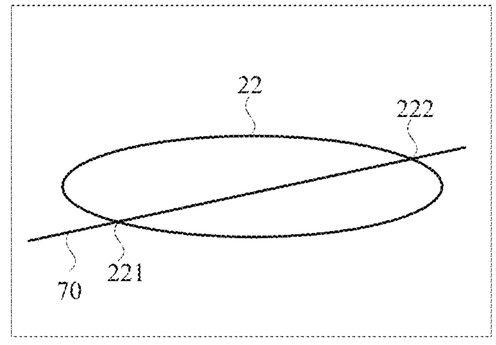
FIG. 7 is a schematic diagram of a sound wave line provided by an embodiment of the present application.

Referring to FIG. 7, the two intersections of the target straight line 70 and the sound wave line 22 are a point 221 and a point 222, respectively. As a result, the point 221 and the point 222 are the first position and the second position of the sound wave line, respectively; the colors of the point 221 and the point 222 are the first color and the second color, respectively; and the color of the sound wave line 22 from the point 221 to the point 222 is gradually varied from the first color to the second color.

In some implementations, before the above-described step S12 (displaying the sound effect display interface corresponding to the target audio file), the sound effect display method provided by the embodiment of the present application further includes: determining the first color, the second color, and a background color of the sound effect display interface according to a color of the cover image.

In some implementations, the implementation of determining the first color, the second color, and the background color of the sound effect display interface according to the color of the cover image may include the following steps 1 to 3.

Step 1, acquiring an average color value of pixel points of the cover image.

That is, a color value of each pixel point of the cover image is acquired, and the color values of respective pixel points are added together and then divided by the number of the pixel points in the cover image to obtain the average color value of the pixel points of the cover image.

Step 2, converting the average color value into a color in HSV color space to obtain a base color.

Specifically, the HSV color space is a color space that represents colors by hue (Hue), saturation (Saturation) and brightness (Value). Any color in the HSV color space includes a parameter H for representing the hue, a parameter S for representing the saturation and a parameter V for representing the value.

There are specific conversion formulas between colors in different color spaces, so a conversion formula can be determined according to the color space to which the cover image belongs, and then the average color value can be converted according to the determined conversion formula to obtain the base color. For example, if the cover image belongs to RGB color space, the average color value is converted according to a conversion formula between colors of RGB color space and HSV color space to obtain the base color.

Step 3, determining the first color, the second color, and the background color of the sound effect display interface according to the base color.

In some implementations, the determining the first color according to the base color includes:

Determining that a hue of the first color is as same as a hue of the base color;

Determining that a saturation of the first color is as same as a saturation of the base color if the saturation of the base color is greater than or equal to a threshold saturation; and determining that the saturation of the first color is a sum of the saturation of the base color and a preset saturation if the saturation of the base color is smaller than the threshold saturation; and Determining that a value of the first color is a maximum value.

Given: the hue, the saturation, and the value of the base color are $H_0$, $S_0$ and $V_0$, respectively; the hue, the saturation, and the value of the first color are $H_1$, $S_1$ and $V_1$, respectively; the threshold saturation is $S_{threshold}$, and the preset saturation is a, then, $$H_1 = H_0$$

$$S_1 = \begin{cases} S_0 & S_0 \geq S_{threshold} \\ S_0 + a & S_0 < S_{threshold} \end{cases}$$

$$V_1 = 100$$

In some implementations, the determining the second color according to the base color includes: determining that a hue of the second color is a sum of a hue of the base color and a preset hue; determining that a saturation of the second color is as same as a saturation of the base color if the saturation of the base color is greater than or equal to a threshold saturation; and determining that the saturation of the second color is a sum of the saturation of the base color and a preset saturation if the saturation of the base color is smaller than the threshold saturation; and determining that a value of the second color is a maximum value.

Given: the hue, the saturation, and the value of the base color are $H_0$, $S_0$ and $V_0$, respectively; the hue, the saturation, and the value of the second color are $H_2$, $S_2$ and $V_2$, respectively; the threshold saturation is $S_{threshold}$, the preset saturation is a, and the preset hue is b, then, $$H_2 = H_0 + b.$$

$$S_2 = \begin{cases} S_0 & S_0 \geq S_{threshold} \\ S_0 + a & S_0 < S_{threshold} \end{cases}.$$

$$V_2 = 100.$$

In some implementations, the determining the background color according to the base color includes: determining that a hue of the background color is as same as a hue of the base color; determining that a saturation of the background color is as same as a saturation of the base color if the saturation of the base color is greater than or equal to a threshold saturation; and determining that the saturation of the background color is a sum of the saturation of the base color and a preset saturation if the saturation of the base color is smaller than the threshold saturation; and determining that a value of the background color is a difference between a value of the base color and a target value, wherein the target value is a value corresponding to a value range to which the value of the base color belongs, and the value corresponding to the value range is positively correlated with a central value of the value range.

For example, the corresponding relationship between the value range and the value is shown in the following Table 1:

TABLE 1

| Value Range | Corresponding Value |
|---|---|
| [100, 90] | 55 |
| [90, 80] | 50 |
| [80, 70] | 45 |
| [70, 60] | 40 |
| [60, 50] | 35 |
| [50, 40] | 30 |
| [40, 30] | 25 |
| [30, 25] | 20 |
| [25, 20] | 15 |
| [20, 15] | 10 |
| [15, 10] | 7 |
| [10, 5] | 3 |
| [5, 0] | 2 |

Given: the hue, the saturation, and the value of the base color are $H_0$, $S_0$ and $V_0$, respectively; the hue, the saturation, and the value of the background color are $H_3$, $S_3$ and $V_3$, respectively; the threshold saturation is $S_{threshold}$, the preset saturation is a, and the corresponding relationship between the value range and the value is as shown in Table 1 above, then, $$H_3 = H_0.$$

$$S_3 = \begin{cases} S_0 & S_0 \geq S_{threshold} \\ S_0 + a & S_0 < S_{threshold} \end{cases}.$$

$$V_3 = V_{0-}c.$$

When $100 \geq V_0 \geq 90$, c=55; when $90 > V_0 \geq 80$, c=50; when $80 > V_0 \geq 70$, c=45; when $70 > V_0 \geq 60$, c=40; when $60 > V_0 \geq 50$, c=35; when $50 > V_0 > 40$, c=30; when $40 > V_0 \geq 30$, c=25; when $30 > V_0 \geq 25$, c=20; when $25 > V_0 \geq 20$, c=15; when $20 > V_0 \geq 15$, c=15; when $15 > V_0 \geq 10$, c=7; when $10 > V_0 \geq 5$, c=3; and when $5 > V_0 \geq 0$, c=2.

The above-described embodiment can determine the first color, the second color and the background color in the sound effect display interface according to the cover image of the audio file. Therefore, the color of the sound effect display interface in the embodiment of the present application can be more matched and correlated to the cover image, thereby improving the visual experience of users.

Based on the same inventive concept, as an implementation of the above-described method, the embodiment of the present application also provides a terminal device, and the device embodiment is corresponding to the above-described method embodiment. For the convenience of reading, the details and contents of the above-described method embodiment will not be particularly repeated one by one in the device embodiment. However, it is to be noted that the terminal device in this embodiment can realize all the contents of the above-described method embodiment correspondingly.

Figure 8:
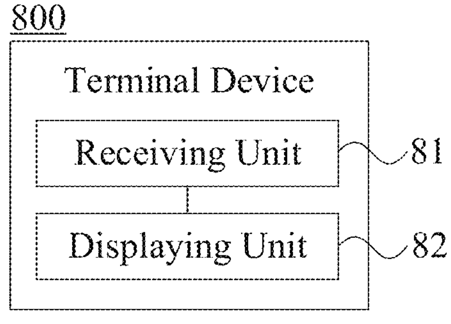
FIG. 8 is a schematically structural diagram of a terminal device provided by an embodiment of the present application.

The embodiment of the present application provides a terminal device. FIG. 8 is a schematically structural diagram of the terminal device. As shown in FIG. 8, the terminal device 800 includes: a receiving unit 81 configured to receive a first operation that is input to a target audio file; and a displaying unit 82 configured to display a sound effect display interface corresponding to the target audio file in response to the first operation; the sound effect display interface includes a grid, a sound wave line, and a cover image corresponding to the target audio file; the grid is located on a first plane in an interface scenario of the sound effect display interface, and the first plane is a horizontal plane in the interface scenario; the sound wave line is a closed curve in the first plane and is configured to display a sound waveform corresponding to a preset sound attribute of the target audio file; the cover image is located on a second plane in the interface scenario, and a lower edge of the cover image is located in an area enclosed by the sound wave line on the first plane, and the second plane is a plane perpendicular to a depth direction of the interface scenario.

In some implementations, the sound effect display interface further includes a plurality of first light beams and a plurality of second light beams.

The plurality of first light beams are all located on the first plane, and the plurality of first light beams are parallel to each other.

The plurality of second light beams are all perpendicular to the first plane.

In some implementations, the sound effect display interface further includes a light dot matrix.

The light dot matrix is located on the first plane, and the light spots of the light dot matrix are arranged around both sides of the sound wave line.

In some implementations, a distance from the sound wave line to an edge of the sound effect display interface is greater than or equal to a threshold distance.

In some implementations, the displaying unit 82 is specifically configured to generate a sequence frames corresponding to the grid, the plurality of first light beams, and the plurality of second light beams; positions of the plurality of first light beams and the plurality of second light beams in an image frame of the sequence frames vary sequentially; the sequence frames is played circularly to display the sound effect display interface corresponding to the target audio file.

In some implementations, the displaying unit 82 is specifically configured to display the sequence frames, the sound wave line, and the cover image in different layers of the sound effect display interface.

In some implementations, a color of a first position of the sound wave line is a first color, and a color of a second position of the sound wave line is a second color.

Between the first position and the second position of the sound wave line, a color of the sound wave line is gradually varied from the first color to the second color.

In some implementations, the displaying unit 82 is further configured to: acquire an average color value of pixel points of the cover image before displaying the sound effect display interface corresponding to the target audio file; convert the average color value into a color in an HSV color space to obtain a base color; and determine the first color, the second color, and a background color of the sound effect display interface according to the base color.

In some implementations, the displaying unit 82 is specifically configured to: determine that a hue of the first color is as same as a hue of the base color; determine that a saturation of the first color is as same as a saturation of the base color if the saturation of the base color is greater than or equal to a threshold saturation, and determine that the saturation of the first color is a sum of the saturation of the base color and a preset saturation if the saturation of the base color is smaller than the threshold saturation; and determine that a value of the first color is a maximum value.

In some implementations, the displaying unit 82 is specifically configured to: determine that a hue of the second color is a sum of a hue of the base color and a preset hue; determine that a saturation of the second color is as same as a saturation of the base color if the saturation of the base color is greater than or equal to a threshold saturation, and determine that the saturation of the second color is a sum of the saturation of the base color and a preset saturation if the saturation of the base color is smaller than the threshold saturation; and determine that a value of the second color is a maximum value.

In some implementations, the displaying unit is specifically configured to: determine that a hue of the background color is as same as a hue of the base color; determine that a saturation of the background color is as same as a saturation of the base color if the saturation of the base color is greater than or equal to a threshold saturation, and determine that the saturation of the background color is a sum of the saturation of the base color and a preset saturation if the saturation of the base color is smaller than the threshold saturation; and determine that a value of the background color is a difference between a value of the base color and a target value, wherein the target value is a value corresponding to a value range to which the value of the base color belongs, and the value corresponding to the value range is positively correlated with a central value of the value range.

In some implementations, the first position and the second position are two intersection positions of a target straight line and the sound wave line, respectively. The target straight line is a straight line passing through a geometric center of the sound wave line in the first plane and having an included angle with respect to a horizontal direction, and the included angle is a preset angle.

The terminal device provided in this embodiment can carry out the sound effect display method provided in the above-described method embodiment with the same implementation principle and the same technical effect, which are not particularly described here.

Figure 9:
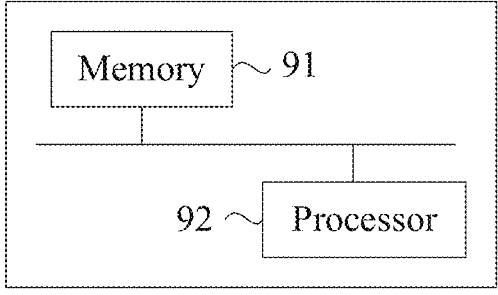
FIG. 9 is a schematic diagram of a hardware structure of an electronic apparatus provided by an embodiment of the present application.

Based on the same inventive concept, the embodiment of the present application also provides an electronic apparatus. FIG. 9 is a schematically structural diagram of an electronic apparatus provided by an embodiment of the present application. As shown in FIG. 9, the electronic apparatus provided by this embodiment includes a memory 91 and a processor 92, the memory 91 is configured for storing a computer program; the processor 92 is configured to enable the electronic apparatus to realize the sound effect display method provided in the above-described embodiment upon calling and executing the computer program.

The embodiment of the present application also provides a computer-readable storage medium having a computer program stored thereon, and the computer program enables a computing apparatus to realize the sound effect display method provided in the above-described embodiment upon the computer program being executed by the computing apparatus.

The embodiment of the present application also provides a computer program product, which enables a computer to realize the sound effect display method provided in the above-described embodiment upon the computer program product being executed on the computer.

It is to be understood by those skilled in the art that embodiments of the present application may be provided as a method, a system, or a computer program product. Therefore, the present application may be in a form of an entirely hardware embodiment, an entirely software embodiment, or an embodiment combining software aspect and hardware aspect. Furthermore, the present application may be in a form of a computer program product embodied on one or more computer usable storage mediums having computer usable program codes included therein.

The processor can be a central processing unit (CPU), and can also be other general processors, a digital signal processor (DSP), an application specific integrated circuit (ASIC), a field-programmable gate array (FPGA) or other programmable logic devices, a discrete gate or a transistor logic device, a discrete hardware component or the like. The general processor can be a microprocessor, or the processor can also be any conventional processor or the like.

The memory may include the form of a non-permanent memory, a random-access memory (RAM) and/or a non-volatile memory in a computer-readable medium, such as a read-only memory (ROM) or a flash memory (flash RAM). The memory is an example of the computer-readable medium.

The computer-readable medium includes a permanent or non-permanent, removable or non-removable storage medium. The storage medium can store information by any method or technology, and the information can be computer-readable instructions, data structures, program modules or other data. Examples of the storage medium for computers include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic cassette, magnetic disk storage or other magnetic storage devices or any other non-transmission medium, which can be used for storing information accessible by a computing apparatus. According to the definition in the present application, the computer-readable medium does not include temporary storage of computer readable media (transitory media), such as modulated data signals and carrier waves.

Finally, it is to be noted that the above embodiments are only used to illustrate, not restrict the technical solutions of the present application. Although the present application is described in detail with reference to the above embodiments, it is to be understood for one of ordinary skill in the art that it is still possible to make modification to the technical solutions recorded in the above embodiments, or make equivalent substitution to some or all of the technical features therein, and such modifications or substitutions will not make the nature of the corresponding technical solutions depart from the scope of the technical solutions of the embodiments of the present application.

What is claimed is:

1. A sound effect display method, comprising:

receiving a first operation that is input to an audio file; and displaying a sound effect display interface corresponding to the audio file in response to the first operation, wherein the sound effect display interface comprises a grid, a sound wave line, and a cover image corresponding to the audio file; the grid is located on a first plane in an interface scenario of the sound effect display interface, and the first plane is a horizontal plane in the interface scenario; the sound wave line is a closed curve in the first plane and is configured to display a sound waveform corresponding to a sound attribute of the audio file; the cover image is located on a second plane in the interface scenario, and a lower edge of the cover image is located in an area enclosed by the sound wave line on the first plane, and the second plane is a plane perpendicular to a depth direction of the interface scenario.

2. The method according to claim 1, wherein the sound effect display interface further comprises a plurality of first light beams and a plurality of second light beams;

the plurality of first light beams are all located on the first plane, and the plurality of first light beams are parallel to each other; and the plurality of second light beams are all perpendicular to the first plane.

3. The method according to claim 2, wherein the displaying the sound effect display interface corresponding to the audio file comprises:

generating a sequence frames corresponding to the grid, the plurality of first light beams, and the plurality of second light beams, wherein positions of the plurality of first light beams and the plurality of second light beams in an image frame of the sequence frames vary sequentially; and circularly playing the sequence frames to display the sound effect display interface corresponding to the audio file.

4. The method according to claim 3, wherein the displaying the sound effect display interface corresponding to the audio file comprises:

displaying the sequence frames, the sound wave line, and the cover image in different layers of the sound effect display interface, respectively.

5. The method according to claim 2, wherein a color of a first position of the sound wave line is a first color, and a color of a second position of the sound wave line is a second color; and between the first position and the second position of the sound wave line, a color of the sound wave line is gradually varied from the first color to the second color.

6. The method according to claim 5, wherein, before displaying the sound effect display interface corresponding to the audio file, the method further comprises:

acquiring an average color value of pixel points of the cover image;

converting the average color value into a color in an HSV color space to obtain a base color, and determining the first color, the second color, and a background color of the sound effect display interface according to the base color.

7. The method according to claim 6, wherein the determining the first color according to the base color comprises:

determining that a hue of the first color is as same as a hue of the base color;

determining that a saturation of the first color is as same as a saturation of the base color if the saturation of the base color is greater than or equal to a threshold saturation; determining that the saturation of the first color is a sum of the saturation of the base color and a first saturation if the saturation of the base color is smaller than the threshold saturation; and determining that a value of the first color is of a maximum value.

8. The method according to claim 6, wherein the determining the second color according to the base color comprises:

determining that a hue of the second color is a sum of a hue of the base color and a first hue;

determining that a saturation of the second color is as same as a saturation of the base color if the saturation of the base color is greater than or equal to a threshold saturation; determining that the saturation of the second color is a sum of the saturation of the base color and a first saturation if the saturation of the base color is smaller than the threshold saturation; and determining that a value of the second color is of a maximum value.

9. The method according to claim 1, wherein the sound effect display interface further comprises a light dot matrix;

the light dot matrix is located on the first plane, and light dots of the light dot matrix are arranged around both sides of the sound wave line.

10. The method according to claim 1, wherein a distance from the sound wave line to an edge of the sound effect display interface is greater than or equal to a threshold distance.

11. The method according to claim 1, wherein a color of a first position of the sound wave line is a first color, and a color of a second position of the sound wave line is a second color; and between the first position and the second position of the sound wave line, a color of the sound wave line is gradually varied from the first color to the second color.

12. The method according to claim 11, wherein, before displaying the sound effect display interface corresponding to the audio file, the method further comprises:

acquiring an average color value of pixel points of the cover image;

converting the average color value into a color in an HSV color space to obtain a base color; and determining the first color, the second color, and a background color of the sound effect display interface according to the base color.

13. The method according to claim 12, wherein the determining the first color according to the base color comprises:

determining that a hue of the first color is as same as a hue of the base color;

determining that a saturation of the first color is as same as a saturation of the base color if the saturation of the base color is greater than or equal to a threshold saturation; determining that the saturation of the first color is a sum of the saturation of the base color and a first saturation if the saturation of the base color is smaller than the threshold saturation; and determining that a value of the first color is of a maximum value.

14. The method according to claim 12, wherein the determining the second color according to the base color comprises:

determining that a hue of the second color is a sum of a hue of the base color and a first hue;

determining that a saturation of the second color is as same as a saturation of the base color if the saturation of the base color is greater than or equal to a threshold saturation; determining that the saturation of the second color is a sum of the saturation of the base color and a first saturation if the saturation of the base color is smaller than the threshold saturation; and determining that a value of the second color is of a maximum value.

15. The method according to claim 12, wherein the determining the background color according to the base color comprises:

determining that a hue of the background color is as same as a hue of the base color;

determining that a saturation of the background color is as same as a saturation of the base color if the saturation of the base color is greater than or equal to a threshold saturation; determining that the saturation of the background color is a sum of the saturation of the base color and a first saturation if the saturation of the base color is smaller than the threshold saturation; and determining that a value of the background color is a difference between a value of the base color and a first value, wherein the first value is a value corresponding to a value range to which the value of the base color belongs, and the value corresponding to the value range is positively correlated with a central value of the value range.

16. The method according to claim 11, wherein the first position and the second position are two intersection positions of a first straight line and the sound wave line, respectively; the first straight line is a straight line passing through a geometric center of the sound wave line in the first plane and having an included angle with respect to a horizontal direction, wherein the included angle is a first angle.

17. An electronic apparatus, comprising a memory and a processor, wherein the memory is configured for storing a computer program; and the processor is configured to enable the electronic apparatus to:

receive a first operation that is input to an audio file; and display a sound effect display interface corresponding to the audio file in response to the first operation, wherein the sound effect display interface comprises a grid, a sound wave line, and a cover image corresponding to the audio file; the grid is located on a first plane in an interface scenario of the sound effect display interface, and the first plane is a horizontal plane in the interface scenario; the sound wave line is a closed curve in the first plane and is configured to display a sound waveform corresponding to a sound attribute of the audio file; the cover image is located on a second plane in the interface scenario, and a lower edge of the cover image is located in an area enclosed by the sound wave line on the first plane, and the second plane is a plane perpendicular to a depth direction of the interface scenario.

18. The electronic apparatus according to claim 17, wherein the sound effect display interface further comprises a plurality of first light beams and a plurality of second light beams;

the plurality of first light beams are all located on the first plane, and the plurality of first light beams are parallel to each other; and the plurality of second light beams are all perpendicular to the first plane.

19. The electronic apparatus according to claim 17, wherein the sound effect display interface further comprises a light dot matrix;

the light dot matrix is located on the first plane, and light dots of the light dot matrix are arranged around both sides of the sound wave line.

20. A non-transitory computer-readable storage medium, wherein a computer program is stored thereon, the computer program enables a computing apparatus to:

receive a first operation that is input to an audio file; and display a sound effect display interface corresponding to the audio file in response to the first operation, wherein the sound effect display interface comprises a grid, a sound wave line, and a cover image corresponding to the audio file; the grid is located on a first plane in an interface scenario of the sound effect display interface, and the first plane is a horizontal plane in the interface scenario; the sound wave line is a closed curve in the first plane and is configured to display a sound waveform corresponding to a sound attribute of the audio file; the cover image is located on a second plane in the interface scenario, and a lower edge of the cover image is located in an area enclosed by the sound wave line on the first plane, and the second plane is a plane perpendicular to a depth direction of the interface scenario.

* * * * *